(12) United States Patent
Williamson et al.

(10) Patent No.: US 10,819,519 B2
(45) Date of Patent: Oct. 27, 2020

(54) MULTI-TENANT DATA PROTECTION IN A CENTRALIZED NETWORK ENVIRONMENT

(71) Applicant: Protegrity Corporation, Grand Cayman (KY)

(72) Inventors: David Clyde Williamson, Great Missenden (GB); George Curran, Northport, NY (US); Raul Ortega, Westport, CT (US); Jan Boberg, Skelleftea (SE); Rajnish Jain, Fairfield, CT (US); Yigal Rozenberg, Wilton, CT (US)

(73) Assignee: Protegrity Corporation, Grand Cayman (KY)

( * ) Notice: Subject to any disclaimer, the term of this patent is extended or adjusted under 35 U.S.C. 154(b) by 178 days.

(21) Appl. No.: 16/188,295

(22) Filed: Nov. 13, 2018

(65) Prior Publication Data

US 2019/0158288 A1    May 23, 2019

Related U.S. Application Data

(60) Provisional application No. 62/588,920, filed on Nov. 21, 2017.

(51) Int. Cl.
*H04L 9/32* (2006.01)
*G06F 3/06* (2006.01)
(Continued)

(52) U.S. Cl.
CPC .......... *H04L 9/3213* (2013.01); *G06F 3/067* (2013.01); *G06F 3/0622* (2013.01);
(Continued)

(58) Field of Classification Search
CPC ..... G06F 3/067; H04L 9/0894; H04L 9/0869; H04L 9/3213
See application file for complete search history.

(56) References Cited

U.S. PATENT DOCUMENTS

| 8,978,152 B1 * | 3/2015 | Rozenberg .......... G06F 21/6254 726/26 |
| 9,237,006 B2 | 1/2016 | Mattsson et al. |

(Continued)

FOREIGN PATENT DOCUMENTS

EP    3193487 A1    7/2017

OTHER PUBLICATIONS

Mattsson, U.T., "Bridging the Gap Between Access and Security in Big Data," ISACA Journal, 2014, vol. 6, pp. 1-5.
(Continued)

*Primary Examiner* — Ellen Tran
(74) *Attorney, Agent, or Firm* — Fenwick & West LLP

(57) ABSTRACT

Data can be protected in a centralized tokenization environment. A security value is received by a central server from a client device. The central server accesses a token table corresponding to the client device and generates a reshuffled static token table from the accessed token table based on the received security value. When the client device subsequently provides data to be protected to the central server, the central server tokenizes the provided data using the reshuffled static token table and stores the tokenized data in a multi-tenant database. By reshuffling token tables using security values unique to client devices, the central server can protect and store data for each of multiple tenants such that if the data of one tenant is compromised, the data of each other tenant is not compromised.

17 Claims, 3 Drawing Sheets

(51) Int. Cl.
*H04L 29/06* (2006.01)
*G06F 21/62* (2013.01)
*H04L 9/08* (2006.01)
*G06F 16/245* (2019.01)

(52) U.S. Cl.
CPC .......... *G06F 3/0659* (2013.01); *G06F 16/245* (2019.01); *G06F 21/6218* (2013.01); *G06F 21/6254* (2013.01); *H04L 9/0869* (2013.01); *H04L 9/0894* (2013.01); *H04L 63/0853* (2013.01); *H04L 63/102* (2013.01); *H04L 2209/08* (2013.01)

(56) References Cited

U.S. PATENT DOCUMENTS

| | | |
|---|---|---|
| 2013/0103685 A1 | 4/2013 | Preneel et al. |
| 2014/0177825 A1* | 6/2014 | Mattsson ................. H04L 9/06 380/28 |
| 2014/0181955 A1* | 6/2014 | Rosati ..................... G06F 21/44 726/18 |
| 2015/0039519 A1 | 2/2015 | Mattsson et al. |
| 2015/0371058 A1 | 12/2015 | Mattsson |
| 2016/0119289 A1 | 4/2016 | Jain et al. |
| 2016/0260089 A1* | 9/2016 | Chen ..................... H04L 9/3247 |
| 2017/0053138 A1 | 2/2017 | Rozenberg et al. |

OTHER PUBLICATIONS

PCT International Search Report and Written Opinion, PCT Application No. PCT/US2018/061972, dated Feb. 11, 2019, 22 pages.

* cited by examiner

MULTI-TENANT DATA PROTECTION IN A CENTRALIZED NETWORK ENVIRONMENT

CROSS REFERENCE TO RELATED APPLICATIONS

The application claims the benefit of Provisional Application No. 62/588,920, filed on Nov. 21, 2017, the contents of which are incorporated herein by reference.

FIELD OF ART

This application relates generally to the field of data protection, and more specifically to the tokenization of data in a centralized tokenization environment.

BACKGROUND

Data storage entities, such as online data storage providers and networked databases, often store data for many data owner entities within a single database. When multiple data owners store data within the same database, the data owners can be thought of as "tenants" of the database. There are various data security challenges unique to such a data storage context. For instance, if common access criteria are implemented for the database, each tenant may be able to access another tenant's data. Likewise, if a common data protection scheme were implemented for the database, if the security for one tenant's data were breached by a malicious entity, the malicious entity may be able to access each tenant's data. Accordingly, storing data for multiple tenants within a common database without accounting for the nature of multi-tenant data storage may expose tenants to security risks.

SUMMARY

The centralized data protection architecture described herein addresses the security needs of a data storage entity storing data for multiple tenants. A central server accesses a base token table corresponding to a set of user accounts, for instance from a token server. The central server receives a security value from each of a plurality of corresponding client devices, each security value unique to a corresponding client device or user account. The central server can generate a reshuffled token table based on the base token table and further based on and corresponding to each security value, each reshuffled token table unique to a corresponding client device or user account. The reshuffled token tables can be generated on demand, for instance in response to a request from a client device or user account for data protection. Generating the reshuffled token tables on demand based on the base token table reduces the amount of storage required by the central server. For instance, the central server can store only the base token table (or can access the base token table on demand) without having to store the reshuffled token tables.

Data can be subsequently received from a client device, and the central server can access or generate the reshuffled token table corresponding to the client device or a user account associated with the client device. The central server can then tokenize the received data by querying the reshuffled static token table with a value of a portion of the received data to identify a token value mapped to the value of the portion of the accessed data and replacing the portion of the received data with the identified token value. The tokenized data can then be provided to a multi-tenant data storage entity. As each tenant's data with the multi-tenant data storage entity is tokenized using a different reshuffled token table, the compromise of a first tenant's data doesn't compromise a second tenant's data. Thus, the technical solution described herein addresses the technical problem of implementing data security in a multi-tenant data storage entity environment.

Figure 1:
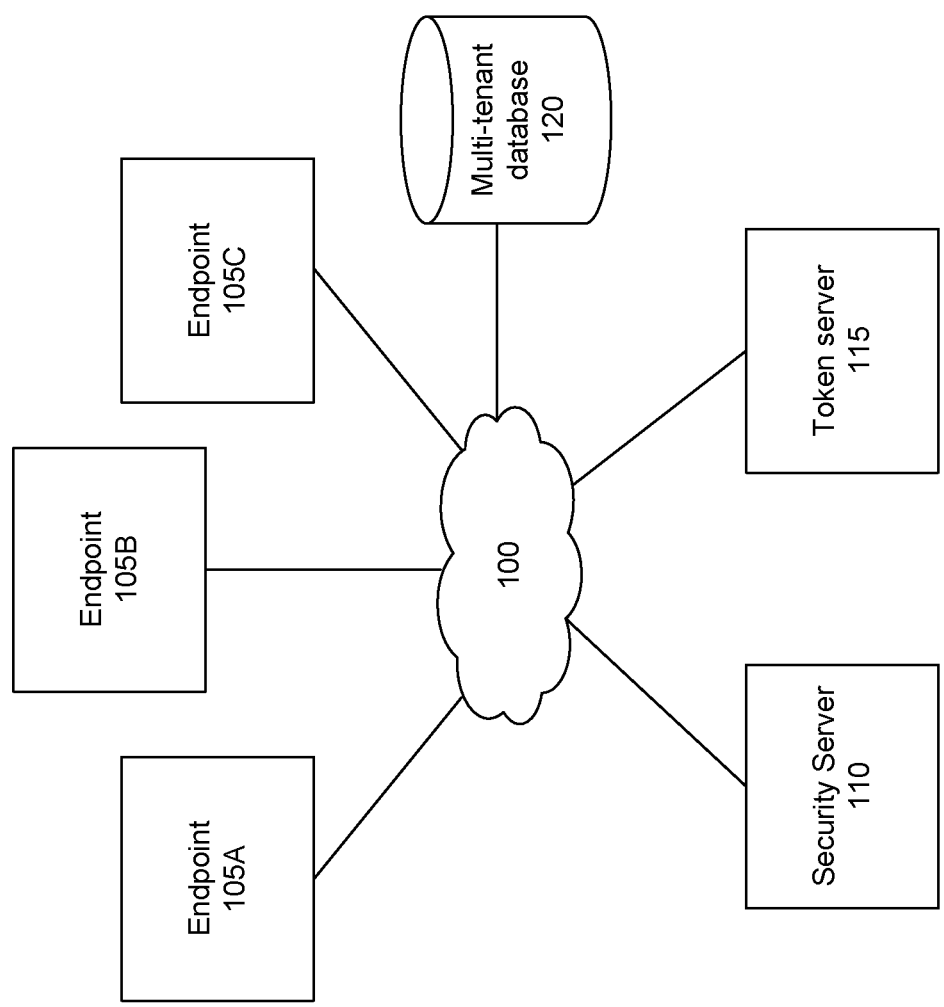
FIG. 1 illustrates an example centralized tokenization environment, according to one embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Tokenization Overview

As used herein, the tokenization of data refers to the generation of tokenized data by querying one or more token tables mapping input values to tokens with one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or format-preserving encryption), a one-way non-reversible cryptographic function (e.g., a hash function with strong, secret salt), or a similar encryption before or after the tokenization of the sensitive data. Any suitable type of encryption can be used in the tokenization of data.

As used herein, the term token refers to a string of characters mapped to an input string of characters in a token table, used as a substitute for the string of characters in the creation of tokenized data. A token may have the same number of characters as the string being replaced, or can have a different number of characters. Further, the token may have characters of the same type (such as numeric, symbolic, or alphanumeric characters) as the string of characters being replaced or characters of a different type. Tokens can be randomly generated and assigned to a particular token table input value.

Any type of tokenization may be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and may include every possible input string value. The second column of an SLT includes tokens, with each associated with an input string value of the first column. Each token in the second column may be unique among the tokens in the second column. Optionally, the SLT may also include one or several additional columns with additional tokens mapped to the input string values of the first column. A seed value can be used to generate an SLT, for instance by generating random numbers based on the seed value for each token in the SLT.

An SLT can be shuffled using a shuffle operation to create a new SLT, for instance by re-ordering the tokens mapped to the input values. The tokens can be re-ordered when shuffling an SLT based on a seed value, such as a randomly generated number value. The seed value can be used to select a token from the tokens of the SLT to map to the first input value, can be used to select a second token from the tokens of the SLT to map to the second input value, etc. For example, the seed value can be used to seed a random number generator which randomly selects token values from the tokens of the SLT for mapping to the input values of the SLT. Likewise, the seed value can be used to modify tokens within the SLT to produce new tokens for the SLT. For instance, the seed value can be used to seed a mathematical function (such as a hash function, modulo addition, multiplication, dot products, and the like) which converts a value of each token to a new value, which are stored within the SLT, replacing the corresponding tokens. Shuffling the values of tokens within a token table produces a shuffled token table, allowing a data storage entity to use a different encoding mechanism (the shuffled token table) without requiring the shuffled token table to be transmitted to the data storage entity (e.g., the shuffled token table can be generated from a token table to which the data storage entity has access). Such embodiments enable the data storage entity to continue to update their security protocols and procedures without requiring the bandwidth associated with transmitting large SLTs and/or without requiring the data storage entity to be communicatively connected to a token server.

In some embodiments, to increase the security of tokenization, sensitive data can be tokenized two or more times using the same or additional token tables. Each successive tokenization is referred to as a "tokenization iteration" herein. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data may also be left un-tokenized; thus a first subset of the resulting tokenized data may contain portions of the sensitive data and a second subset of the tokenized data may contain a tokenized version of the sensitive data.

Dynamic token lookup table ("DLT") tokenization operates similarly to SLT tokenization, but instead of using static tables for multiple tokenization operations, a new token table entry is generated each time sensitive data is tokenized. A seed value can be used to generate each DLT. In some embodiments, the sensitive data or portions of the sensitive data can be used as the seed value. DLTs can in some configurations provide a higher level of security compared to SLT, but can also require the storage and/or transmission of a large amount of data associated with each of the generated token tables. While DLT tokenization can be used to tokenize data according to the principles described herein, the remainder of the description will be limited to instances of SLT tokenization for the purposes of simplicity The security of tokenization can be further increased through the use of initialization vectors ("IVs"). An IV is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

As used herein, "tokenization parameters" refers to the properties or characteristics of a tokenization operation. For example, tokenizing data according to tokenization parameters can refer to but is not limited to one or more of the following: the generation of token tables for use in tokenizing the data; the identity of pre-generated token tables for use in tokenizing the data; the type and number of token tables for use in tokenizing the data; the identity of one or more tokens for use in tokenizing the data; the number of tokenization iterations to perform; the type, number, and source of initialization vectors for use in modifying the data prior to tokenization; the portion of sensitive data to be tokenized; and encryption operations to perform on the data before or after tokenization. Tokenization and initialization vectors are described in greater detail in U.S. patent application Ser. No. 13/595,438, titled "Multiple Table Tokenization", filed Aug. 27, 2012, the contents of which are hereby incorporated by reference.

Centralized Tokenization Environment Overview

FIG. 1 illustrates an example centralized tokenization environment, according to one embodiment. The environment of FIG. 1 includes a plurality of endpoints 105*a*, 105*b*, and 105*c* (referred to individually and collectively as "endpoint 105" or "client device"), a security server 110, a token server 115, and a multi-tenant database 120. The entities of FIG. 1 are, include, or are implemented within computing devices and configured to transmit and receive data through a connecting networking 100. In other embodiments, the tokenization environment illustrated in FIG. 1 can include additional, fewer, or different entities, and the entities illustrated can perform functionalities differently or other than those described herein. Further, any number of each type of entity shown in FIG. 1 can be included in various embodiments of a tokenization environment. For example, thousands or millions of endpoints can communicate with one or more security server and/or token server. It should be noted that although one tenant may be associated with multiple endpoints and vice versa, for the sake of simplicity, each endpoint is described herein as being associated with one tenant, and thus "endpoint" and "tenant" may be used interchangeably herein.

The connecting network 100 is typically the Internet, but may be any network, including but not limited to a LAN, a MAN, a WAN, a mobile wired or wireless network, a private network, a virtual private network, a direct communication line, and the like. The connecting network can be a combination of multiple different networks. In addition, the connecting network 100 can be located within any entity illustrated in FIG. 1 in whole or in part, and can include both inner- and inter-entity communication lines.

An endpoint 105 is a computing device, and can be a mobile device such as a mobile phone, a tablet computer, or a laptop computer. An endpoint can also be a traditionally non-mobile entity, such as a desktop computer, a television, an ATM terminal, a ticket dispenser, a retail store payment system, a website, a database, and the like. Each endpoint includes software configured to allow a user of the endpoint to interact with other entities within the environment of FIG. 1. For example, the endpoint can include a mobile wallet application or other payment application configured to allow a user to use the endpoint to transmit payment information when conducting a transaction, for instance at a store or restaurant. In such an example, the endpoint can provide data to the security server 110 for tokenization, and the security server can tokenize data using a token table received from the token server and shuffled based on a seed value received from the endpoint. The tokenized data can then be provided to a data storage entity, for instance a multi-tenant database 120.

The security server 110 (or "central server") is configured to encode data provided by each endpoint 105 using a tokenization scheme unique to each tenant. The security server is described in more detail below. The token server 115 is configured to generate and/or access tokens and token tables, and to provide the tokens and token tables to the security server for use in tokenizing and detokenizing data and generating shuffled token tables. Both the security server and the token server are computing devices configured to perform the functionalities described herein. For example, the security server can receive a token table (such as an SLT) from the token server, and can, for each endpoint, shuffle the received token table based on a seed value received from the endpoint to produce a shuffled token table unique to the endpoint. Thus the security server can, based on as few as one token table, produce a different shuffled token table for each endpoint, beneficially preventing data stored in a multi-tenant database 120 associated with a first endpoint or tenant from being compromised in the event that a token table associated with a second endpoint or tenant is compromised.

Data Protection in Centralized Tokenization Environment

Figure 2:
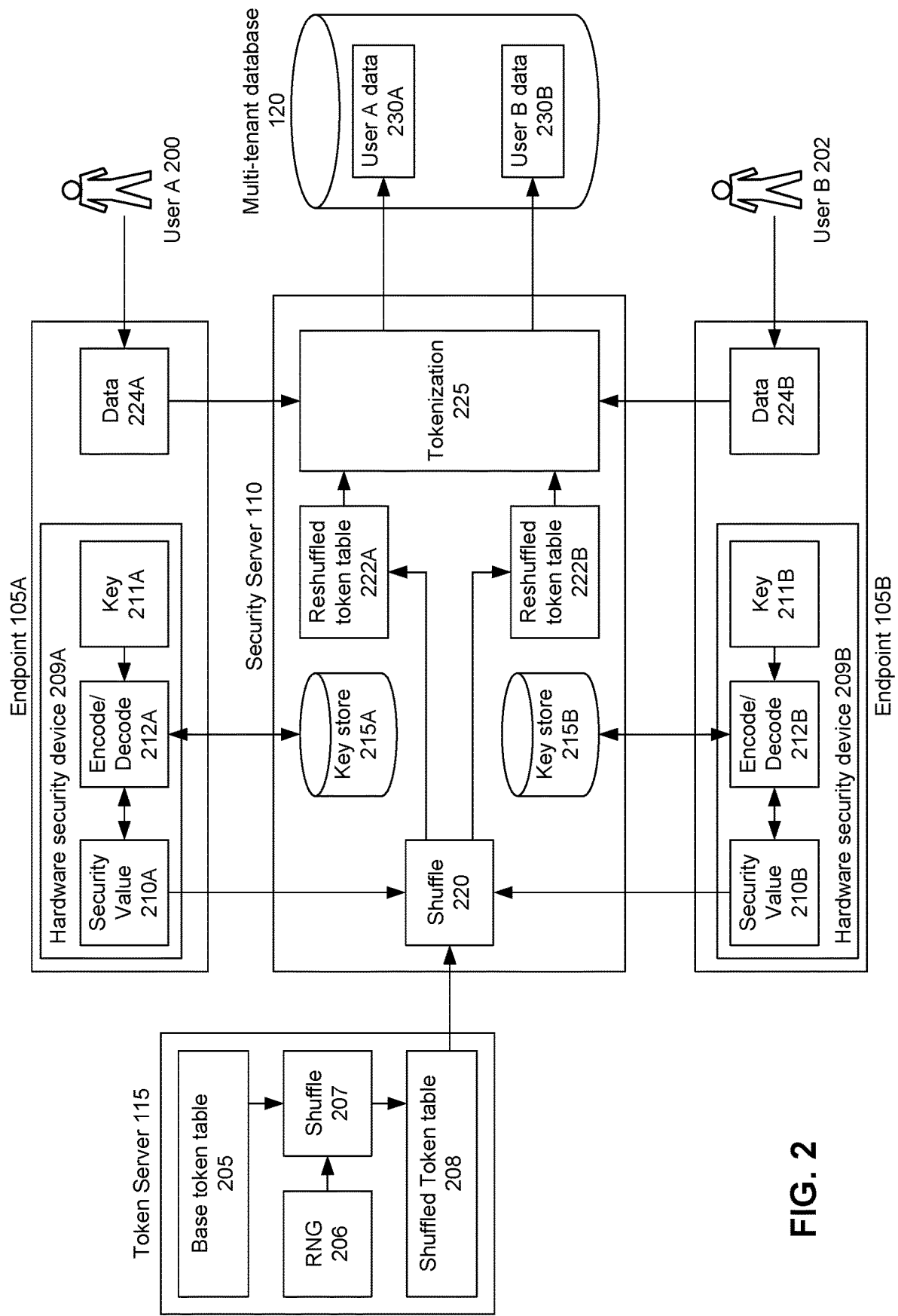
FIG. 2 illustrates multi-tenant dataflow and storage within a centralized tokenization environment, according to one embodiment.

FIG. 2 illustrates multi-tenant dataflow and storage within a centralized tokenization environment, according to one embodiment. In the embodiment of FIG. 2, User A 200 ("User A" hereinafter) and User B 202 ("User B" hereinafter) communicate with the security server 110 via the endpoints 105A and 105B respectively. The security server generates unique reshuffled token tables for each endpoint 105, beneficially enabling the protection of data of each of User A and User B such that the compromise of the data of one does not compromise the data of the other. It should be noted that the dataflow illustrated in FIG. 2 is associated with two endpoint devices and two users, but in other embodiments, the security server can protect data from any number of endpoints and users (such as hundreds or thousands of endpoints and users), and can store such data in the multi-tenant database 120.

In order to generate a reshuffled token table unique to each of User A and User B, the security server 110 first accesses a token table corresponding to both User A and User B (a token table from which the reshuffled token tables are generated). The accessed token table can correspond to a set of users or user accounts that includes User A and User B, as well as any number of additional users.

The accessed token table can be received from the token server 115. The token server 115 includes a base token table 205. The base token table can be pre-generated (e.g., before a request for a token table from the security server 110, for instance when initializing or registering the security server with the token server), or can be generated in response to a request from the security server. In some embodiments, the base token table corresponds to a set of security servers, and is generated based on a property or characteristic of one or more security servers or users or entities associated with the security servers.

The token server 115 includes a random number generator 206 ("RNG" hereinafter) that generates a shuffle seed value for use by a shuffle engine 207 (configured to perform a shuffle operation, as described herein) in shuffling the token values of the base token table 205 to generate the shuffled token table 208. For instance, the RNG can generate a random string of digits, bits, or values that can be used by the shuffle engine to modify the token values and/or the order of token values within the base token table for mapping to the input values of the shuffled token table. In embodiments wherein the base token table corresponds to multiple security servers, the token server generates a different shuffle seed value for each security server such that the token server produces a different shuffled token table for each security server. In some embodiments, the token server stores the generated seed values in conjunction with an identifier for each security server, enabling the token server to subsequently generate requested shuffled token tables for any security server without having to store the shuffled token tables, beneficially reducing the amount of storage required by the token server 115.

The security server 110 accesses or requests a token table (e.g., the shuffled token table 208) for use in generating reshuffled token tables for each user account or endpoint corresponding to or associated with the security server. In the embodiment of FIG. 2, the security server generates a reshuffled token table 222A associated with User A, and generates reshuffled token table 222B associated with User B. The reshuffled token tables are generated by the security server either in advance of receiving a request to protect data from an endpoint or in response to receiving a request to protect data. For instance, the security server can generate a reshuffled token table in response to an endpoint or user account registering with the security server, in response to receiving a security value from an endpoint (as described below), in response to an application running on an endpoint requesting the generation of a reshuffled token table, or in response to a user or endpoint providing data to be protected to the security server.

To generate a reshuffled token table, the security server 110 receives a security value from the endpoint. For instance, the security server receives the security value 210A from a hardware security device 209A communicatively coupled to the endpoint 105A. Although the term "hardware security device" is used herein, it should be noted that the hardware security device can be either hardware (such as a hardware security module or dongle coupled to a port of or wirelessly connected to the endpoint, or a hardware component or circuit within the endpoint itself), software (such as a virtual hardware security device or security key generator), or a combination of the two. In some embodiments, the security server receives the security value directly from the endpoint, for instance a security value stored within a secure storage or a memory of the endpoint, or a security value entered by a user of the endpoint. The security value associated with each endpoint or user account is unique to that endpoint or user account.

Continuing with the embodiment of FIG. 2, the shuffle ending 220 of the security server 110 uses the security value 210A to generate the reshuffled token table 222A from the shuffled token table 208. For instance, as described above, the shuffle engine performs a shuffle operation, such as a hash function or a token value re-ordering operation, on the shuffled token table using the security value as a seed value for the shuffle operation to produce the reshuffled token table. The security value can be generated by the hardware security device, for instance using a random number generator and/or in response to a request from the security server or a request from the User A to protect data or to register with the security server. As the security value associated with an endpoint or user account is unique to that endpoint or user account, the reshuffled token table produced by shuffle engine using the security value is likewise unique to the endpoint or user account.

The hardware security device 209A also includes an encode/decode engine 212A, which is configured to encode (e.g., via encryption, tokenization, or any other reversible data operation) the security value 210A using a key 211A (such as an encryption key or unique index value). The encoded security value is then provided to the security server 110 for storage in the key store 215A. When the security value is again needed, for instance in response to a request to access protected data or a request to protect additional data, the encode/decode engine can access the encoded security value, can decode it using the key 211A, and can provide the decoded security value (equivalent to security value 210A) to the security server for use in re-generating the reshuffled token table 222A.

By storing the encoded security value within the key store 215A, the data storage requirements for the hardware security device 209A or the endpoint 105A are beneficially reduced, since the generated security value 210A does not have to be persistently stored by the hardware security device or the endpoint. In addition, by storing the encrypted security value within the key store, if User A accesses the security server via a second endpoint different from endpoint 105A, the second endpoint can access the encoded security value from the key store, can decrypt it (for instance, using a key provided by User A or the second endpoint), and can enable User A to both access protected data or to protect additional data using the same security value 210A.

Continuing with the embodiment of FIG. 2, the endpoint 105A provides data 224A to the security server 110 for protection, for instance in response to a request from User A, in response to a request from an application running on the endpoint, or during the implementation of a communicative process between the endpoint and the security server that requires data protection. For example, the data can be sensitive data entered by User A within an interface field presented by the endpoint, can be account data associated with a cryptocurrency application running on the endpoint, or can be handshake data provided by the endpoint to the security server during the implementation of an encryption protocol. It should be noted that although reference is made to data provided by the endpoint to the security server, in practice, the data can be sent by the endpoint to a different destination entity (such as a web site, a web server, a different endpoint, or the multi-tenant database 120, and the security server can be an intermediary between the destination entity and the endpoint (for instance, a web gateway, a firewall server, or a server configured to intercept data sent from the endpoint or received by the destination entity).

The security server 110, upon receiving the data 224A from the endpoint 105A, either accesses the reshuffled token table 222A corresponding to the endpoint or User A (in the event that the reshuffled token table has already been generated), or generates the reshuffled token table (for instance by accessing the security value 210A from the endpoint and reshuffling the token table provided by the token server 115. The security server includes a tokenization engine 225 that uses the reshuffled token table to tokenize the data. For instance, the security server queries the reshuffled token table with a value of a portion of the data to identify a token value mapped to the value of the portion of the data, and replaces the portion of the data within the identified token value to produce tokenized data. In some embodiments, the data can be modified or encoded prior to or after tokenization, either by the endpoint or the security server, and based on an encoding or encryption key, based on an initialization vector accessed by the security server, based on an identity of the endpoint or user, based on a type of data being protected, or based on any other suitable property or characteristic of the user, the endpoint, the security server, or the data.

In the embodiment of FIG. 2, after the data 224A is tokenized, the tokenized data is provided by the tokenization engine 225 to the multi-tenant database 120. In particular, the tokenized data is stored in a portion of the multi-tenant database associated with User A ("User A data 230A"). The User A data portion of the multi-tenant database can be a separate memory or database table within the multi-tenant database, can be a set of database columns or rows associated with User A, or can be any other portion of a database or data storage entity. Although tokenized data is provided to the multi-tenant database in the embodiment of FIG. 2, in practice, the security server 110 can provide the tokenized data to any entity, such as a web server, an entity associated with the endpoint or User A, or any other suitable entity. Likewise, in some embodiments, the multi-tenant database 120 is a cloud server, a local database or hard drive, an endpoint or client device, a desktop or laptop computer, a mobile device, and the like.

In addition, the embodiment of FIG. 2 includes User B 202 interacting with the security server 110 via the endpoint 105B. The shuffle engine 220 generates a reshuffled token table 222B based on a security value 210B received from the endpoint. As with endpoint 105A, the endpoint 105B includes an encode/decode engine 212B that encodes the security value using a key 211B and stores the encoded security value within the key store 215B of the security server for subsequent decoding and use by the shuffle engine. The tokenization engine 225 uses the reshuffled token table to tokenize data 224B received from the endpoint, and stores the tokenized data within a portion of the multi-tenant database associated with User B ("User B data 230B").

The security server can generate both the reshuffled token table 222A and the reshuffled token table 222B from the same token table (shuffled token table 208). Both reshuffled token table 222A and 222B are different (e.g., reshuffled token table 222A maps a different token value to a particular input value than reshuffled token table 222B) and are unique to User A and User B, respectively. Accordingly, the tokenization engine 225 can tokenize the same data received from the endpoint 105A and separately endpoint 105B, and the resulting tokenized data will be different because different token tables were used (e.g., reshuffled token table 222A and reshuffled token table 222B). Because the reshuffled token tables used to tokenize data are unique to the user, endpoint, or user account associated with the reshuffled token table, the compromise of a first reshuffled token table does not result in the compromise of other reshuffled token tables. Likewise, data tokenized using a first reshuffled token table is not compromised as a result of a second reshuffled token table being compromised. Thus, each tenant's data within the multi-tenant database 120 is protected independently but based on the same token table, reshuffled based on the security value unique to each tenant.

In some embodiments, the shuffled token table 208 is encoded using a key stored within the hardware security device 209 of an endpoint 105. The encoded shuffled token table is then provided to the security server 110 for reshuffling. In order to reshuffle the encoded shuffled token table, the security server provides the encoded shuffled token table to the endpoint and the encoded security value 210 to the hardware security device. The hardware security device then decodes the encoded shuffled token table using the key stored within the hardware security device, decodes the encoded security value, and reshuffles the decoded shuffled token table using the decoded security value to produce the reshuffled token table. The reshuffled token table may then be provided to the security server, may be encoded by the hardware security device prior to providing the reshuffled token table to the security server, or may be used by the endpoint 105 in order tokenize data. In such embodiments, the security server does not have access to the shuffled token table in clear text form, beneficially improving the security of the security server by reducing the potential harm caused by an unauthorized access to the security server.

Figure 3:
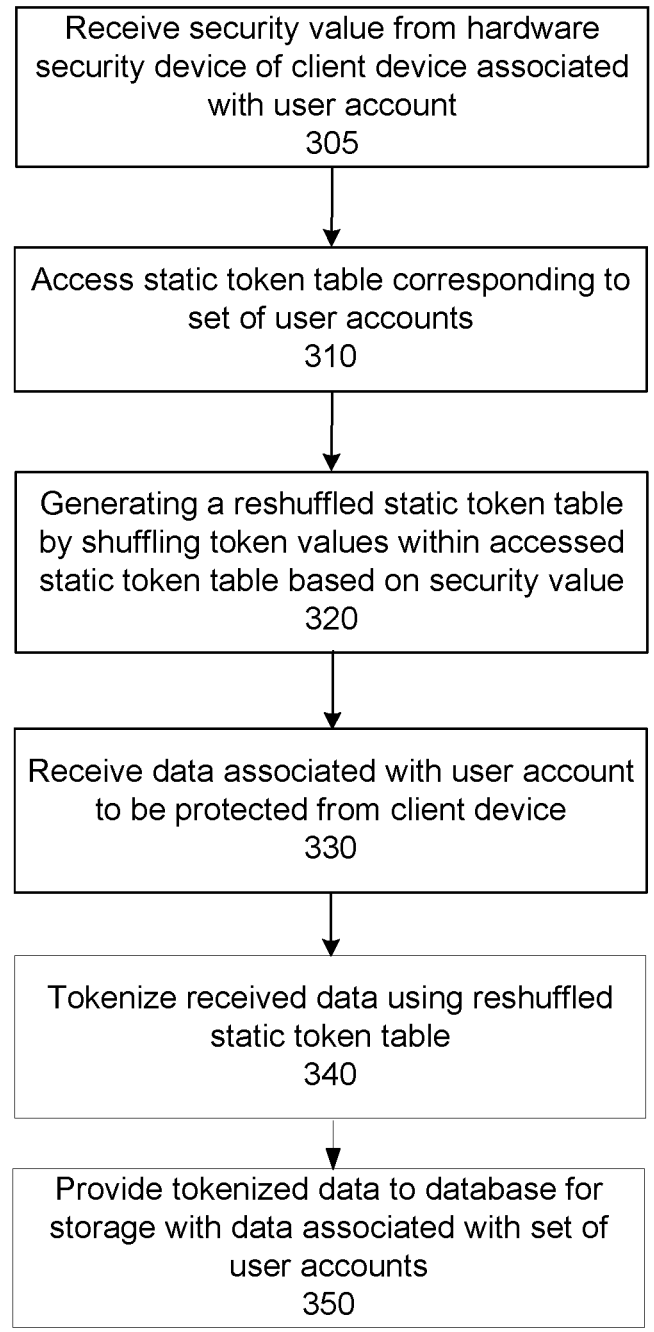
FIG. 3 is a flow chart illustrating the protection of data in a centralized tokenization environment, according to one embodiment.

FIG. 3 is a flow chart illustrating the protection of data in a centralized tokenization environment, according to one embodiment. A security value is received 305 from a client device by, for instance, a security server. The security value can be generated or stored by a hardware security device coupled to the client device, and is associated with a user account of a user of the client device. A static token table corresponding to a set of user accounts including the user account is accessed 310. The static token table maps a different token value to each of a plurality of input values, for instance every combination of characters, bits, or digits for a set input value length. The static token table can be accessed from a token server communicatively coupled to the security server.

A reshuffled static token table is generated 320 by shuffling token values within the accessed static token table based on the security value. For instance, the security value be used to determine an order for re-listing the token values within the accessed static token table, to seed a random number generator used to re-order the token values, or to modify the token values to produce a modified set of token values. The re-ordered/modified set of token values are then mapped to the input values of the accessed static token table to produce a reshuffled static token value unique to the client device or the user account.

Data associated with the user account is received 330 and tokenized 340 by the security server using the reshuffled static token table. For instance, a portion of the received data is used to query the reshuffled static token table to identify a token value mapped to the value of the portion of the received data. The portion of the received data is then replaced using the identified token value to produce tokenized data. The tokenized data is then provided 350 for storage to a database that stores data associated with the set of user accounts. The generation of reshuffled static token tables unique to each user account prevents the compromise of data associated with a first user account from compromising the data associated with a second user account.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for securing data in a centralized environment comprising:
   receiving, by a central server from a client device associated with a user account, an encrypted security value, the client device configured to access the encrypted security value from a hardware security device separate from and coupled to the client device;
   in response to receiving a request to protect data from the client device, providing, by the central server, the encrypted security value previously provided by the client device and stored by the central server to the client device for decryption and receiving a decrypted security value from the client device in response;
   accessing, by the central server, a static token table corresponding to the user account, the static token table mapping each of a plurality of input values to a different token value;
   generating, by the central server, a reshuffled static token table by reshuffling the token values within the static token table based at least in part on the decrypted security value such that at least one input value is mapped by the reshuffled static token table to a different token value than by the static token table;
   receiving, by the central server from the client device, data to be protected;
   tokenizing, by the central server, the received data using the reshuffled static token table by querying the reshuffled static token table with a value of a portion of the received data to identify a token value mapped to the value of the portion of the accessed data and replacing the portion of the received data with the identified token value; and
   providing, by the server, the tokenized data to a database for storage in conjunction with tokenized data corresponding to other user accounts such that an unauthorized access to tokenized data corresponding to a first user account does not compromise tokenized data corresponding to a second user account.

2. The method of claim 1, wherein the accessed static token table corresponds to an enterprise, a company, or set of user accounts including the user account and each of the other user accounts, such that the accessed static token table is only accessed for a user associated with the enterprise, the company, or the set of user accounts.

3. The method of claim 1, wherein the hardware security device comprises 1) a random number generator configured to produce a security value, 2) an encryption key, and 3) an encryption engine configured to encrypt the security value using the encryption key.

4. The method of claim 1, wherein reshuffling the token values comprises seeding a random number generator using the decrypted security value, the random number generator configured to select a token value from the static token table to map to each of the input values of the reshuffled static token table.

5. The method of claim 1, wherein reshuffling the token values comprises modifying one or more token values within the static token table using the decrypted security value to produce the reshuffled static token table.

6. The method of claim 1, further comprising:
   receiving, by the central server from a second client device associated with a second user account, a second security value;
   generating, by the central server, a second reshuffled static token table different from the reshuffled static token table by reshuffling the token values within the static token table based at least in part on the second security value;
   receiving, by the central server from the second client device, second data to be protected;
   tokenizing, by the central server, the received second data using the second reshuffled static token table by querying the second reshuffled static token table with a value of a portion of the second received data to identify a second token value mapped to the value of the portion of the second received data and replacing the portion of the second received data with the identified second token value; and
   providing, by the server, the tokenized second data to the database for storage.

7. A non-transitory computer-readable storage medium storing executable computer instructions that, when executed by a processor, cause the processor to perform steps comprising:
   receiving, by a central server from a client device associated with a user account, an encrypted security value, the client device configured to access the encrypted security value from a hardware security device separate from and coupled to the client device;
   in response to receiving a request to protect data from the client device, providing, by the central server, the encrypted security value previously provided by the client device and stored by the central server to the client device for decryption and receiving a decrypted security value from the client device in response;
   accessing, by the central server, a static token table corresponding to the user account, the static token table mapping each of a plurality of input values to a different token value;
   generating, by the central server, a reshuffled static token table by reshuffling the token values within the static token table based at least in part on the decrypted security value such that at least one input value is mapped by the reshuffled static token table to a different token value than by the static token table;
   receiving, by the central server from the client device, data to be protected;
   tokenizing, by the central server, the received data using the reshuffled static token table by querying the reshuffled static token table with a value of a portion of the received data to identify a token value mapped to the value of the portion of the accessed data and replacing the portion of the received data with the identified token value; and
   providing, by the server, the tokenized data to a database for storage in conjunction with tokenized data corresponding to other user accounts such that an unauthorized access to tokenized data corresponding to a first user account does not compromise tokenized data corresponding to a second user account.

8. The non-transitory computer-readable storage medium of claim 7, wherein the accessed static token table corresponds to an enterprise, a company, or set of user accounts including the user account and each of the other user accounts, such that the accessed static token table is only accessed for a user associated with the enterprise, the company, or the set of user accounts.

9. The non-transitory computer-readable storage medium of claim 7, wherein the hardware security device comprises 1) a random number generator configured to produce a security value, 2) an encryption key, and 3) an encryption engine configured to encrypt the security value using the encryption key.

10. The non-transitory computer-readable storage medium of claim 7, wherein reshuffling the token values comprises seeding a random number generator using the decrypted security value, the random number generator configured to select a token value from the static token table to map to each of the input values of the reshuffled static token table.

11. The non-transitory computer-readable storage medium of claim 7, wherein reshuffling the token values comprises modifying one or more token values within the static token table using the decrypted security value to produce the reshuffled static token table.

12. The non-transitory computer-readable storage medium of claim 7, wherein the instruction, when executed by the processor, cause the processor to perform further steps comprising:
   receiving, by the central server from a second client device associated with a second user account, a second security value;
   generating, by the central server, a second reshuffled static token table different from the reshuffled static token table by reshuffling the token values within the static token table based at least in part on the second security value;
   receiving, by the central server from the second client device, second data to be protected;
   tokenizing, by the central server, the received second data using the second reshuffled static token table by querying the second reshuffled static token table with a value of a portion of the second received data to identify a second token value mapped to the value of the portion of the second received data and replacing the portion of the second received data with the identified second token value; and
   providing, by the server, the tokenized second data to the database for storage.

13. A system for securing data in a centralized environment comprising:
   a non-transitory computer-readable storage medium storing executable computer instructions for:
      receiving, by a central server from a client device associated with a user account, an encrypted security value, the client device configured to access the encrypted security value from a hardware security device separate from and coupled to the client device;
      in response to receiving a request to protect data from the client device, providing, by the central server, the encrypted security value previously provided by the client device and stored by the central server to the client device for decryption and receiving a decrypted security value from the client device in response;
      accessing, by the central server, a static token table corresponding to the user account, the static token table mapping each of a plurality of input values to a different token value;
      generating, by the central server, a reshuffled static token table by reshuffling the token values within the static token table based at least in part on the decrypted security value such that at least one input value is mapped by the reshuffled static token table to a different token value than by the static token table;
      receiving, by the central server from the client device, data to be protected;
      tokenizing, by the central server, the received data using the reshuffled static token table by querying the reshuffled static token table with a value of a portion of the received data to identify a token value mapped to the value of the portion of the accessed data and replacing the portion of the received data with the identified token value; and
      providing, by the server, the tokenized data to a database for storage in conjunction with tokenized data corresponding to other user accounts such that an unauthorized access to tokenized data corresponding to a first user account does not compromise tokenized data corresponding to a second user account; and
   a processor to execute the instructions.

14. The system of claim 13, wherein the accessed static token table corresponds to an enterprise, a company, or set of user accounts including the user account and each of the other user accounts, such that the accessed static token table is only accessed for a user associated with the enterprise, the company, or the set of user accounts.

15. The system of claim 13, wherein the hardware security device comprises 1) a random number generator configured to produce a security value, 2) an encryption key, and 3) an encryption engine configured to encrypt the security value using the encryption key.

16. The system of claim 13, wherein reshuffling the token values comprises seeding a random number generator using the decrypted security value, the random number generator configured to select a token value from the static token table to map to each of the input values of the reshuffled static token table.

17. The system of claim 13, wherein reshuffling the token values comprises modifying one or more token values within the static token table using the decrypted security value to produce the reshuffled static token table.

* * * * *